(12) United States Patent
Denoual et al.

(10) Patent No.: US 11,153,664 B2
(45) Date of Patent: Oct. 19, 2021

(54) METHOD, DEVICE, AND COMPUTER PROGRAM FOR ENCAPSULATING AND PARSING TIMED MEDIA DATA

(71) Applicant: CANON KABUSHIKI KAISHA, Tokyo (JP)

(72) Inventors: Franck Denoual, Saint Domineuc (FR); Frédéric Maze, Langan (FR); Naël Ouedraogo, Maure de Bretagne (FR); Cyril Concolato, Combs la Ville (FR); Jean Le Feuvre, Cachan (FR)

(73) Assignee: Canon Kabushiki Kaisha, Tokyo (JP)

( * ) Notice: Subject to any disclaimer, the term of this patent is extended or adjusted under 35 U.S.C. 154(b) by 55 days.

(21) Appl. No.: 16/099,667

(22) PCT Filed: May 23, 2017

(86) PCT No.: PCT/EP2017/062322
§ 371 (c)(1),
(2) Date: Nov. 7, 2018

(87) PCT Pub. No.: WO2017/202799
PCT Pub. Date: Nov. 30, 2017

(65) Prior Publication Data
US 2019/0158935 A1 May 23, 2019

(30) Foreign Application Priority Data
May 24, 2016 (GB) ..................................... 1609145

(51) Int. Cl.
*H04N 21/845* (2011.01)
*H04N 19/167* (2014.01)
(Continued)

(52) U.S. Cl.
CPC ....... *H04N 21/8456* (2013.01); *H04N 19/167* (2014.11); *H04N 19/174* (2014.11);
(Continued)

(58) Field of Classification Search
None
See application file for complete search history.

(56) References Cited

U.S. PATENT DOCUMENTS

2017/0289556 A1* 10/2017 Hendry ................ H04N 19/119

FOREIGN PATENT DOCUMENTS

| CN | 105052167 A | 11/2015 |
|---|---|---|
| GB | 2522014 A | 7/2015 |

(Continued)

*Primary Examiner* — Xiaolan Xu
(74) *Attorney, Agent, or Firm* — Canon U.S.A., Inc. IP Division

(57) ABSTRACT

The invention relates according to one of its embodiments to a method for encapsulating a partitioned timed media data, the partitioned timed media data comprising timed samples, at least one timed sample comprising at least one subsample. The method comprising: obtaining at least one subsample from at least one of the timed samples; creating a first track comprising the at least one obtained subsample; obtaining at least another subsample from the same one of the timed samples; creating a second track comprising said at least another obtained subsample; and generating descriptive metadata, the descriptive metadata comprising a unified descriptor comprising: a first parameter which indicates, when set to 1, that the at least one obtained subsample is a complete frame; and at least a second parameter which specifies coding dependencies between the at least one obtained subsample and the at least another obtained subsample.

19 Claims, 10 Drawing Sheets

(51) Int. Cl.
*H04N 19/174* (2014.01)
*H04N 19/169* (2014.01)
*H04N 21/84* (2011.01)

(52) U.S. Cl.
CPC ....... *H04N 19/188* (2014.11); *H04N 19/1883* (2014.11); *H04N 21/84* (2013.01)

(56) References Cited

FOREIGN PATENT DOCUMENTS

| | | | | |
|---|---|---|---|---|
| GB | 2539462 A | 12/2016 | | |
| KR | 10-2015-0097723 A | 8/2015 | | |
| WO | 2015/059194 A1 | 4/2015 | | |
| WO | WO-2015059194 A1 * | 4/2015 | ........... | H04L 65/608 |
| WO | 2015/104303 A2 | 7/2015 | | |

* cited by examiner

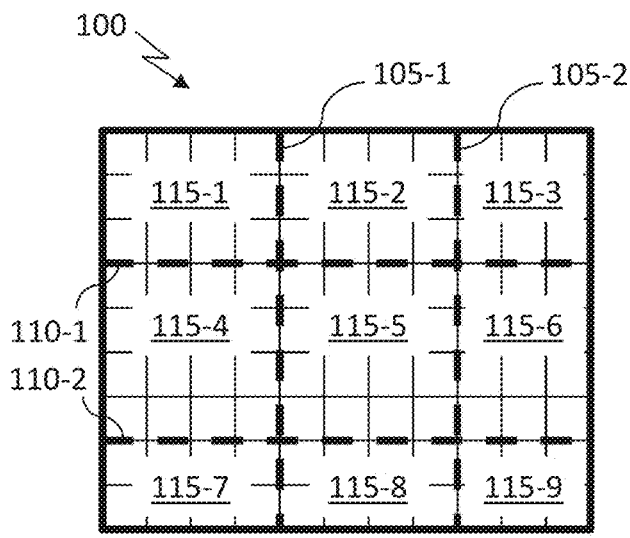
Fig. 1a
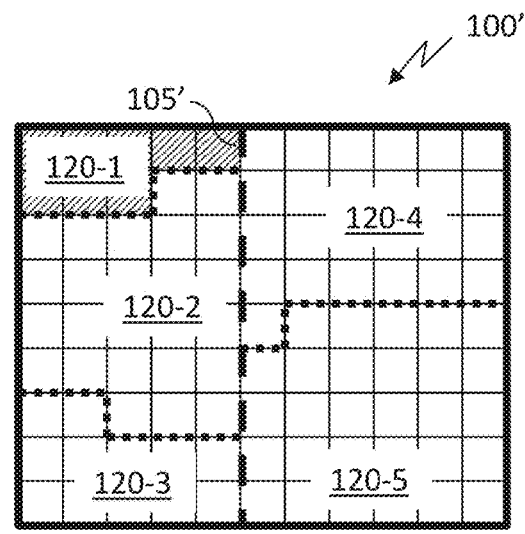
Fig. 1b
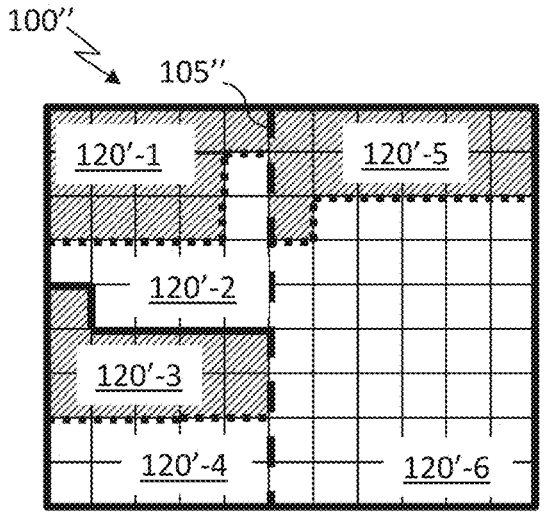
Fig. 1c
| Tile 1 | Tile 2 |
|---|---|
| Tile 3 | Tile 4 |
Fig. 2a

Fig. 2b

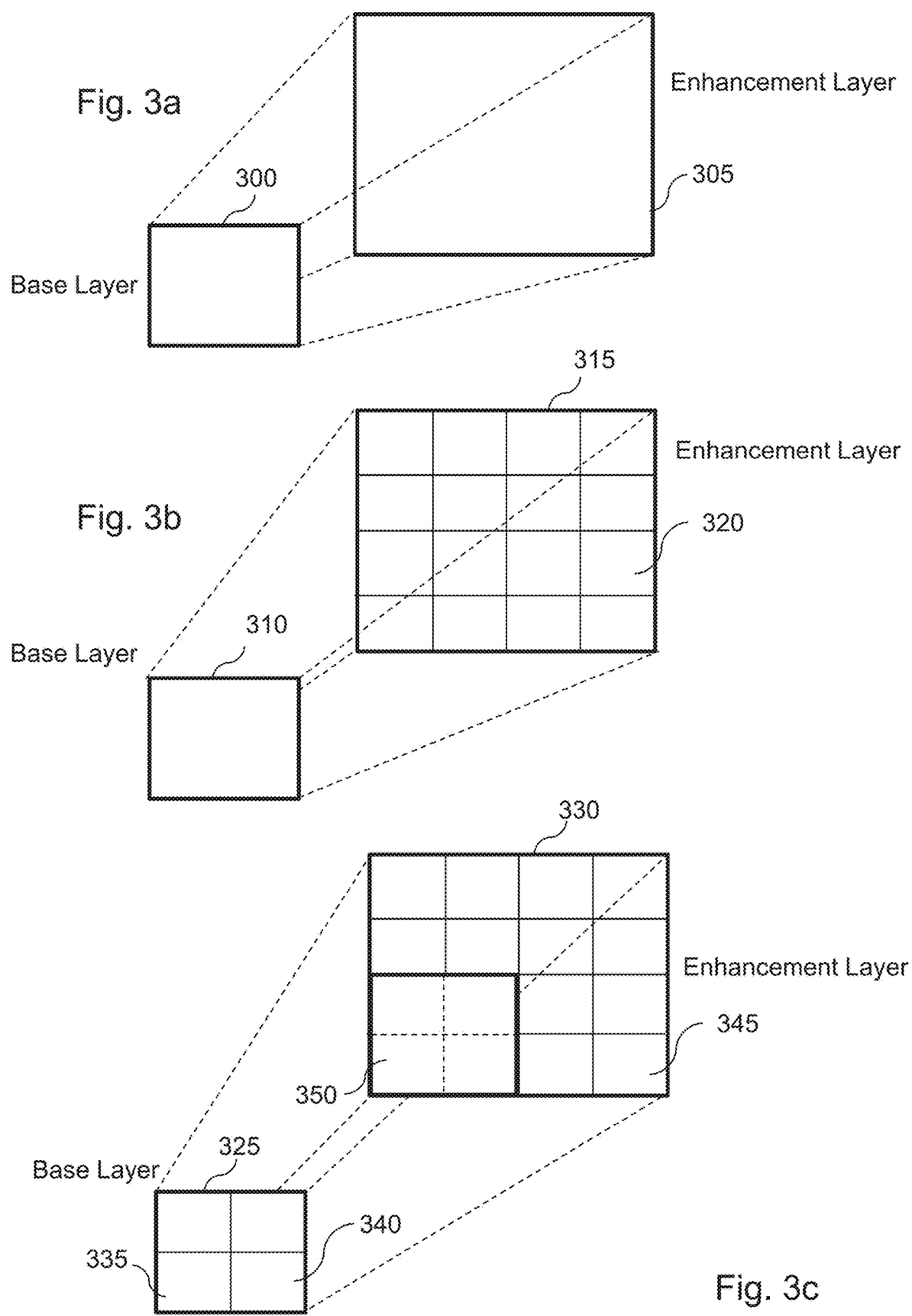

```
TileRegionGroupEntry() extends VisualSampleGroupEntry ('trif') {
            unsigned int(16) groupID;
            unsigned int(2)  independent_idc;
            unsigned int(1)  full_picture;
            unsigned int(1)  filtering_disabled;
            unsigned int(1)  tile_group ;
            unsigned int(1)  has_dependency_list;
            unsigned int(1)  has_irap_dependency_list;
            unsigned int(1)  reserved=0;
            if (tile_group) {
                        unsigned int(16) tile_count;
                        for (i=1; i<= tile_count; i++)
                                    unsigned int(16) tileGroupID;
            } else {
            if (!full_picture) {
                        unsigned int(16) horizontal_offset;
                        unsigned int(16) vertical_offset;
            }
            unsigned int(16) region_width;
            unsigned int(16) region_height;
            }
            if (has_dependency_list) {
                        unsigned int(16) dependency_tile_count;
                        for (i=1; i<= dependency_tile_count; i++){
                                    unsigned int(16) dependencyTileGroupID;
                        }
            }
            if (has_irap_dependency_list) {
                        unsigned int(16) irap_dependency_tile_count;
                        for (i=1; i<= irap_dependency_tile_count; i++){
                                    unsigned int(16) irap_dependencyTileGroupID;
                        }
            }
}
```

Fig. 5

```
class TileRegionEntry() extends VisualSampleGroupEntry ('tile') {
    unsigned int(16) region_id;
    unsigned int(16) horizontal_offset;
    unsigned int(16) vertical_offset;
    unsigned int(16) region_width;
    unsigned int(16) region_height;
}
```

601

```
class TileRegionGroupEntry() extends VisualSampleGroupEntry ('trif')
{
    unsigned int(1) full_picture;
    unsigned int(7) template=0;
    unsigned int(16) groupID;
    if (!full_picture) {
        unsigned int(16) horizontal_offset;
        unsigned int(16) vertical_offset;
    }
    unsigned int(16) region_width;
    unsigned int(16) region_height;
}
```

```
class TileRegionGroupEntry() extends VisualSampleGroupEntry ('trif')
{
 unsigned int(16) groupID;
   unsigned int(2)   independent_idc;
   unsigned int(1)   full_picture;
   unsigned int(1)   filtering_disabled;
   unsigned int(1)   tile_group ;
   unsigned int(1)   has_dependency_list;
   unsigned int(1)   has_irap_dependency_list;
   unsigned int(1)   hidden;
 ...
```

METHOD, DEVICE, AND COMPUTER PROGRAM FOR ENCAPSULATING AND PARSING TIMED MEDIA DATA

CROSS-REFERENCE TO RELATED APPLICATIONS

This application is the National Phase application of PCT Application No. PCT/EP2017/062322, filed on May 23, 2017, which claims the benefit under 35 U.S.C. § 119(a)-(d) of United Kingdom Patent Application No. 1609145.6, filed on May 24, 2016, which applications are hereby incorporated by reference herein in their entireties.

FIELD OF THE INVENTION

The invention generally relates to the field of encapsulation and parsing of timed media data, e.g. according to Base Media File Format as defined by the MPEG standardization organization, to provide a flexible and extensible format that facilitates interchange, management, editing, and presentation of the media data and to improve stream delivery, in particular regarding HTTP (HyperText Transfer Protocol) and RTP (Real-time Transport Protocol) streaming of user-selected regions of interest in compressed video streams.

BACKGROUND OF THE INVENTION

The International Standard Organization Base Media File Format (ISO BMFF) is a well-known flexible and extensible format that describes encoded timed media data bit-streams either for local storage or transmission via a network or via another bit-stream delivery mechanism. This file format is object-oriented. It is composed of building blocks called boxes that are sequentially or hierarchically organized and that define parameters of the encoded timed media data bit-stream such as timing and structure parameters.

This file format can describe various video formats such as SVC (Scalable Video Coding), HEVC (High Efficiency Video Coding) or Layered HEVC (L-HEVC). According to these video formats, a single or multi-layer partitioned timed media data such as multi-layer tiled timed media data (e.g. scalable tiled or Multiview tiled video data) comprising timed samples (e.g. images) are transmitted as a set of several timed media data tracks, typically base tile tracks and tile tracks. In a multi-layer variant, the base tile tracks comprise a base layer base track and at least one enhancement layer base tile track and the tile tracks comprise base layer tile tracks and enhancement layer tile tracks. Each timed media data track comprises one spatial subsample (e.g. several NAL units or contiguous byte-range in a NAL unit) of several timed samples. Such a set of timed media data tracks allows the selecting, composing, and efficient streaming of single or multi-layer spatial video tiles. Each track can be transmitted from a server device to a client device as a set of media segment files. An initialization segment file can be used to transmit metadata required to decode media segment files According to ISO BMFF file format, samples of a track can be grouped to be associated to a common set of properties: this is the sample grouping mechanism that involves two boxes: the SampleToGroupBox and the SampleGroupDescriptionBox. Both can be associated by a grouping_type value. The track have several boxes and a hierarchy of boxes and sub-boxes to describe their properties in terms of media they contain, in terms of samples they contain, typically the sample table box, and in terms of relationships or dependencies with other tracks. The definition of the boxes above mentioned as well as the definition of sub-boxes included in those boxes is described in the document "Draft text of ISO/IEC DIS 14496-15 4th edition, ISO/IEC JTC1/SC29/WG11, W15928, February 2016, San Diego, US" (named "w15928" below). Current boxes or metadata for tile description may lead to complex and less efficient organization of the ISO BMFF metadata. In particular, w15928 defines descriptors for tiles: one is called TileRegionGroupEntry or RectTileRegionGroupEntry with an identifying code 'trif' and another one is called TileSetGroupEntry or UnconstrTileRegionGroupEntry with an identifying code 'tsif'. Both are intended to be declared as sample group properties, called VisualSampleGroupEntries, in the SampleGroupDescriptionBox. 'trif' describes tiles samples in terms of position, size, independence with respect to other tiles or not and indicate whether they cover the full video or not. Each trif has a unique identifier. 'tsif' builds on top of 'trif' to describe set of tiles by aggregating one or more 'trif', referenced through their groupID. 'tsif' also provides coding dependencies list for the tiles, for example when a tile depends on another tile, e.g. when some motion vector to predict a data block of a tile uses a data block from a neighbor tile. As well, when the media is a layered media, a tile in a layer may depend on a tile in another layer: a second list of dependency can provide this list of dependencies. The notion of tile track is also defined and consists in putting in a track only the samples or parts of samples that pertain to a selected tile or set of tiles. When there are one or more tile tracks, they can reference a common tile base track that contains parameter sets information, i.e. initialization data for the decoders. These tile tracks are identified with a specific code (sample entry): 'hvt1' or 'lhv1' (in case of layered media). Even if tile track and trif were designed for easy description and access to independently decodable tiles (a tile that do not depend on any other tiles, except the one co-located in reference pictures), the parsing of these two descriptors is not the most efficient because it requires to parse the tile descriptor, the list of tsif descriptors and to find in the list of tsif the one containing the information for the tile declared in the trif.

Furthermore, in a layered coding context, the tiles from the enhancement layer will always have dependencies to the full picture or to some tiles in the lower layer(s), which implies:
either that the independent_idc field of the TileRegionGroupEntry is always 0, and dependencies are unknown at the 'trif' level (FDIS draft, w15928); or that
the independent_idc field only describes per-layer dependencies (Draft text of ISO/IEC FDIS 14496-15 4th edition, ISO/IEC JTC1/SC29/WG11, w15640), in which case dependencies to the lower layer(s) are unknown at the 'trif' level.

In either cases, in order to find the tiles dependencies, one needs to inspect the TileSetGroupEntry and find a tile set composed of exactly that tile; the tile set will then give the proper dependencies:
dependencies applicable for all NALUs regarding the slice and/or NALU type
optionally, dependencies only applicable for IRAP NALUs, in order to accommodate for cases where the higher layer uses references from the lower layer(s) only on IRAP picture, typically at the beginning of the GOP.

As can be seen from the above discussion, describing inter-layer tiled dependencies in layered HEVC is possible with the current DIS text, but requires an additional level of indirection between TileSetGroupEntry and TileRegionGroupEntry. Although these tile descriptions are usually constant and can be made default sample group description in tile tracks, this extra complexity is not very useful.

To solve these issues, there is provided an efficient data organization and track description scheme suitable especially for handling spatial tiles, scalable layers and multiple views in Layered HEVC for multi-layer video streams. This ensures that the result of the ISO BMFF parsing is more efficient and adapted to single and/or multi layer HEVC.

SUMMARY OF THE INVENTION

It is a broad object of the invention to remedy the shortcomings of the prior art as described above.

According to a first aspect of the invention there is provided a method for encapsulating a partitioned timed media data, the partitioned timed media data comprising timed samples, at least one timed sample comprising at least one subsample, the method comprising:

obtaining at least one subsample from at least one of the timed samples;

creating a first track comprising the at least one obtained subsample;

obtaining at least another subsample from the same one of the timed samples;

creating a second track comprising said at least another obtained subsample; and generating descriptive metadata, the descriptive metadata comprising a unified descriptor comprising: a first parameter which indicates, when set to 1, that the at least one obtained subsample is a complete frame; and at least a second parameter which specifies coding dependencies between the at least one obtained subsample and the at least another obtained subsample.

According to a second aspect of the invention there is provided a method for parsing a partitioned timed media data, the partitioned timed media data comprising timed samples, at least one timed sample comprising at least one subsample, the media data being encapsulated so as to include a first track comprising at least one subsample obtained from at least one of the timed samples and a second track comprising at least another subsample obtained from the same one of the timed samples, and descriptive metadata comprising a unified descriptor including a first parameter which indicates, when set to 1, that the at least one obtained subsample is a complete frame, and at least one second parameter which specifies coding dependencies between the at least one obtained subsample and the at least another obtained subsample;

the method comprising obtaining the unified descriptor of the encapsulated media data and employing the first and second parameters included in the unified descriptor to identify, for a desired subsample, the or each other subsample on which the desired subsample depends.

This advantageously makes the parsing of a partitioned timed media data less complex as subsamples (e.g. tiles) dependencies can be obtained directly from the unified descriptor.

The invention also provides according to other aspects devices and computer programs for encapsulating and parsing partitioned timed media data.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Further advantages of the present invention will become apparent to those skilled in the art upon examination of the drawings and detailed description. It is intended that any additional advantages be incorporated herein.

Embodiments of the invention will now be described, by way of example only, and with reference to the following drawings in which:

FIGS. 1a, 1b, and 1c, illustrate examples of tiles and slice segments in an HEVC bit-stream;

FIGS. 2a and 2b, illustrate an example of encapsulating tiles in multiple tracks;

FIGS. 3a, 3b, and 3c, illustrate different examples of configurations of HEVC scalable bit-streams;

FIG. 5 illustrates the structure and features of the unified tile descriptor;

FIG. 6 shows two alternative examples of the codec-agnostic part;

DETAILED DESCRIPTION OF EMBODIMENTS OF THE INVENTION

Figure 4:
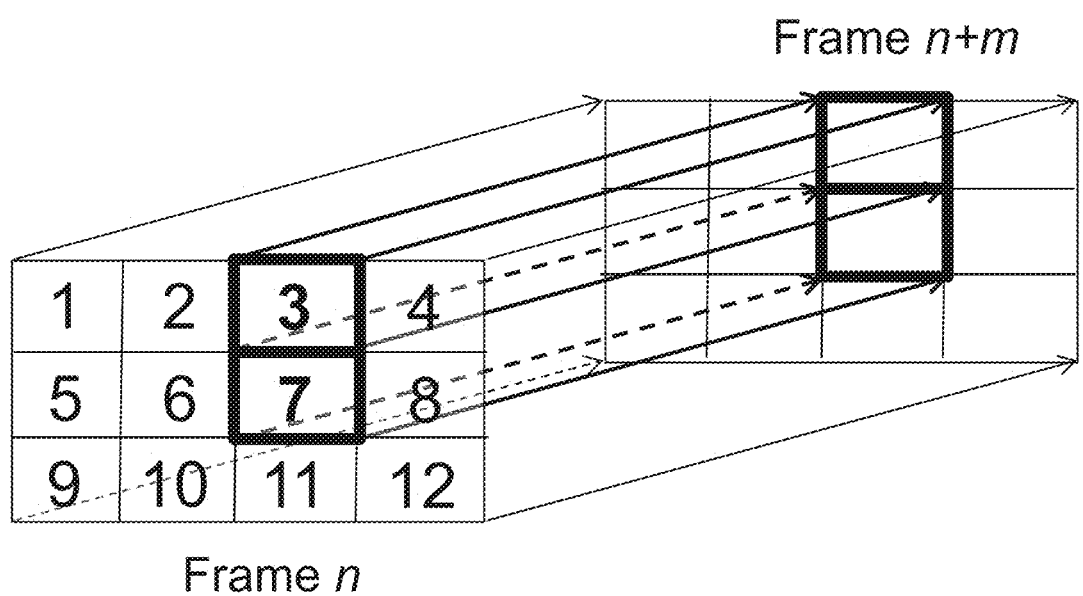
FIG. 4 illustrates a temporal pipe of tiles selected by a user to be displayed.

Embodiments of the invention can apply, for example, to the video format known as HEVC.

According to the HEVC standard, images can be spatially divided into tiles, slices, and slice segments. In this standard, a tile corresponds to a rectangular region of an image that is defined by horizontal and vertical boundaries (i.e., rows and columns). It contains an integer number of Coding Tree Units (CTUs). Therefore, tiles can be efficiently used to identify regions of interest by defining, for example, positions and sizes for regions of interest. However, the structure of an HEVC bit-stream as well as its encapsulation as Network Abstract Layer (NAL) units are not organized in relation to tiles but are based on slices.

In the HEVC standard, slices are sets of slice segments, the first slice segment of a set of slice segments being an independent slice segment, that is to say a slice segment whose general information stored within a header does not refer to that of another slice segment. The other slice segments of the set of slice segments, if any, are dependent slice segments (i.e. slice segments whose general information stored within a header refers to that of an independent slice segment).

A slice segment contains an integer number of consecutive (in raster scan order) Coding Tree Units. Therefore, a slice segment can be of a rectangular shape or not and so, it is not suited to represent a region of interest. It is encoded in an HEVC bit-stream for a slice segment header followed by slice segment data. Independent and dependent slice segments differ by their header: since a dependent slice segment depends on an independent slice segment, the amount of information of its header is smaller than the one of an independent slice segment. Both independent and dependent slice segments contain a list of entry points in the corresponding bit-stream that are used to define tiles or as entropy decoding synchronization points.

FIG. 1, comprising FIGS. 1a, 1b, and 1c, illustrates examples of tiles and slice segments. More precisely, FIG. 1a illustrates an image (100) divided into nine portions by vertical boundaries 105-1 and 105-2 and horizontal boundaries 110-1 and 110-2. Each of the nine portions referenced 115-1 to 115-9 represents a particular tile.

FIG. 1b illustrates an image (100') containing two vertical tiles delimited by vertical boundary 105'. Image 100' comprises a single slice (not referenced) containing five slice segments, one independent slice segment 120-1 (represented with hatched lines) and four dependent slice segments 120-2 to 120-5.

FIG. 1c illustrates an image (100") containing two vertical tiles delimited by vertical boundary 105". The left tile comprises two slices: a first slice containing one independent slice segment (120'-1) and one dependent slice segment (120'-2) and a second slice also containing one independent slice segment (120'-3) and one dependent slice segment (120'-4). The right tile comprises one slice containing one independent slice segment (120'-5) and one dependent slice segment (120'-6).

According to the HEVC standard, slice segments are linked to tiles according to rules that may be summarized as follows (one or both conditions have to be met):

all CTUs in a slice segment belong to the same tile (i.e. a slice segment cannot belong to several tiles); and
  all CTUs in a tile belong to the same slice (i.e. a tile may be divided into several slice segments provided that each of these slice segments only belongs to that tile).

For the sake of clarity, it is considered in the following that one tile contains one slice having only one independent slice segment. However, embodiments of the invention can be carried out with other configurations like the ones illustrated in FIGS. 1b and 1c.

As mentioned above, while tiles can be considered as an appropriate support for regions of interest, slice segments are the entities that are actually put in NAL units for transport over a communication network and aggregated to form access units (i.e. coded picture or samples at file format level).

It is to be recalled that according to the HEVC standard, the type of a NAL unit is encoded in two bytes of the NAL unit header that can be defined as follows:

```
nal_unit_header ( ) {
   forbidden_zero_bit
   nal_unit_type
   nuh_layer_id
   nuh_temporal_id_plus1
}
```

NAL units used to code slice segments comprise slice segment headers indicating the address of the first CTU in the slice segment thanks to a slice segment address syntax element. Such slice segment headers can be defined as follows:

```
slice_segment_header ( ) {
   first_slice_segment_in_pic_flag
   if(nal_unit_type >= BLA_W_LP && nal_unit_type <= RSV_IRAP_VCL23)
      no_output_of_prior_pics_flag
   slice_pic_parameter_set_id
   if(!first_slice_segment_in_pic_flag){
      if(dependent_slice_segments_enabled_flag)
         dependent_slice_segment_flag
      slice_segment_address
   }
   If(!dependent_slice_segment_flag){
   [...]
```

Tiling information is provided in a PPS (Picture Parameter Set) NAL unit. The relation between a slice segment and a tile can then be deduced from these parameters.

While spatial predictions are reset on tile borders (by definition), nothing prevents a tile to use temporal predictors from a different tile in the reference frame(s). Accordingly, to build independent tiles, motion vectors for the prediction units are advantageously constrained inside a tile, during encoding, to remain in the co-located tile in the reference frame(s). In addition, the in-loop filters (deblocking and sample adaptive offset (SAO) filters) are preferably deactivated on the tile borders so that no error drift is introduced when decoding only one tile. It is to be noted that such a control of the in-loop filters is available in the HEVC standard. It is set in slice segment headers with a flag known as loop_filter_across_tiles_enabled_flag. By explicitly setting this flag to zero, the pixels at the tile borders cannot depend on pixels that fall on the border of the neighbor tiles. When these two conditions relating to motion vectors and to in-loop filters are met, tiles can be considered as "independently decodable tiles" or "independent tiles".

When a video bit-stream is encoded as a set of independent tiles, this then enables a tile-based decoding from one frame to another without any risk for missing reference data or propagation of reconstruction errors. This configuration then makes it possible to reconstruct only a spatial part of the original video that can correspond, for example, to the region of interest illustrated in FIG. 4 (comprising tiles 3 and 7). Such a configuration can be indicated as supplemental information in a video bit-stream so as to indicate that tile-based decoding is reliable.

Figure 2B:
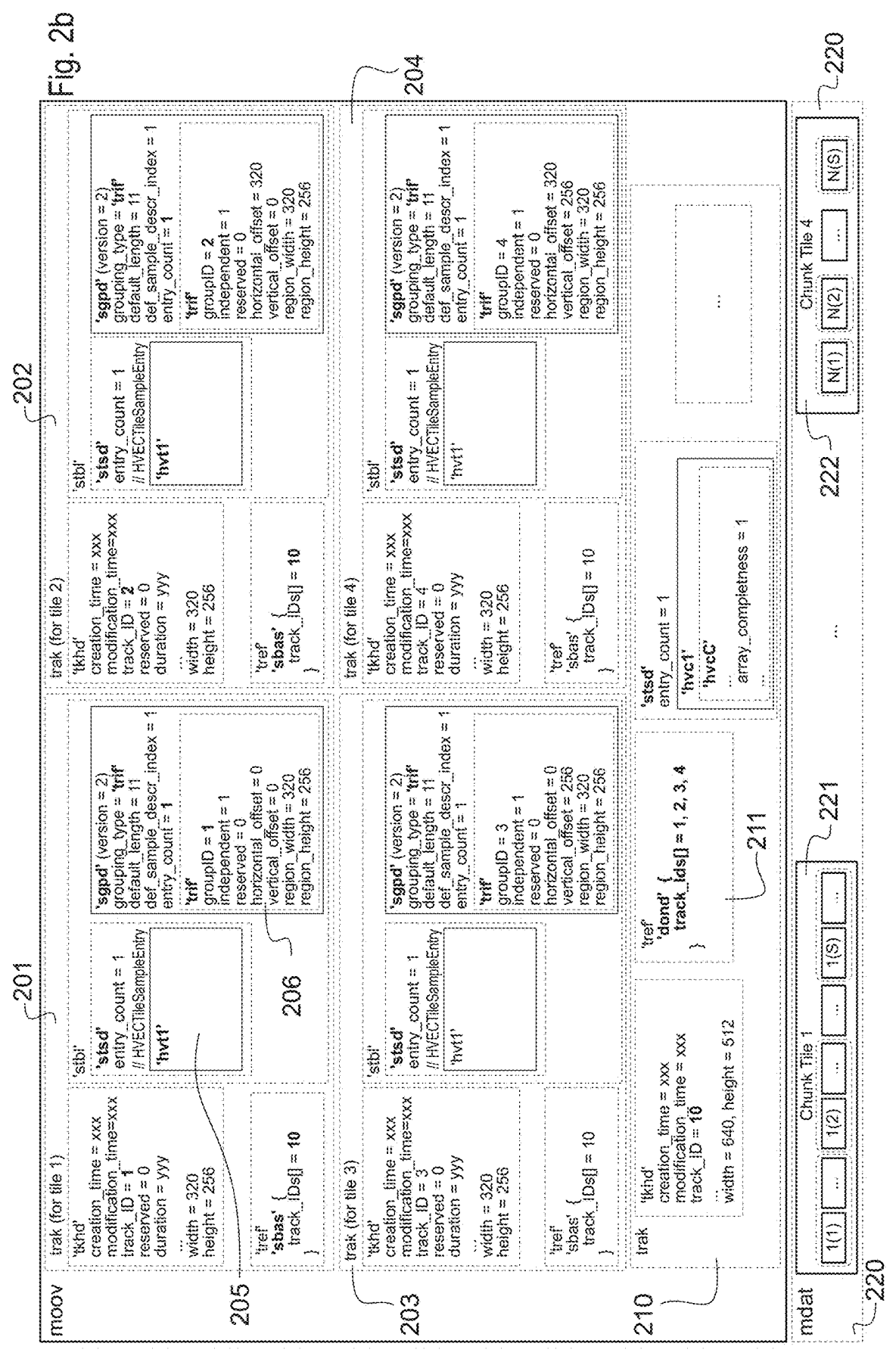

FIG. 2, comprising FIGS. 2a and 2b, illustrates an example of encapsulating tiles in multiple tracks.

FIG. 2a illustrates an example of tile configuration. For the sake of illustration, it comprises four tiles (tile 1 to tile 4), the size of each tile being of 310 pixel width and 256 pixel height.

FIG. 2b illustrates an example of encapsulating the four tiles represented in FIG. 2a into independent tracks according to the MPEG-4 file format. As illustrated, each tile is encapsulated in its own track, enabling efficient data addressing and leading to encapsulating the video as 5 tracks: four tile tracks referenced 201, 202, 203, and 204 for encapsulating each tile and one parameter set track 210 (also referred to as base track in the description) common to all tile tracks.

The description of each tile track (201, 202, 203, and 204) is based on a TileRegionGroupEntry box (identified by the 'trif' reference), such as TileRegionGroupEntry box 206.

Here, the 'trif' boxes use the default sample grouping mechanism (with attribute default_sample_description_index=1, noted def_sample_descr_index=1 in the Figure) to associate all the samples of the tile track to the appropriate TileRegionGroupEntry or TileSetGroupEntry. For example, the NAL units 221 corresponding to tile 1 are described in track 1 (referenced 201) in the TileRegionGroupEntry box 206.

There is no need here for a NALUMapEntry descriptor since all samples in a given track map to the tile described by this track. References 221 and 222 designate, respectively, data chunks that contain data for tile 1 and tile 4 from time 1 to time S (duration of the media file or media segment in case of track fragments).

Actually the track samples are not conventional video samples since in this embodiment, they are tile samples: a sample stored in a tile track is a complete set of slices for one or more tiles, as defined in ISO/IEC 23008-2 (HEVC). This excludes parameter sets, SEI messages, and other non-VCL NAL units. An HEVC sample stored in a tile track is considered as a sync sample if the VCL NAL units in the sample indicate that the coded slices contained in the sample are Instantaneous Decoding Refresh (IDR) slices, Clean Random Access (CRA) slices, or Broken Link Access (BLA) slices. As such, they do not have the same sizes as conventional samples would have: according to the example of FIG. 2a, conventional HEVC samples would have a size of 640×512 pixels while here, the HEVC samples stored in each tile track have a size of 320×256 pixels. In order to avoid ambiguity at parsing time, the tile samples are signaled with a new type of VisualSampleEntry descriptor: the HEVCTileSampleEntry descriptor, such as HEVCTileSampleEntry descriptor 205 associated with track 1 (designated with 4-letter code 'hvt1').

Formally, the sample entries of HEVC video tracks are HEVCSampleEntries declared in the sample description box of each track header. Here, since multiple tracks representing the same video stream are used, each tile track comprises an indication that the samples in the track are actually samples of a sub part of a complete video stream, indicating that these samples are samples of the HEVCTileSampleEntry type (each 'hvt1' box in the Sample Description box 'stsd' of each track). Then, the decoding of a tile track does not involve any layout operation, and the tile is decoded at the same place in the video decoder memory as if all tiles were decoded. Then the layout information in the track header of a tile track are set identical to the track header information of the associated base track as identified by the 'tbas' track reference type. Otherwise, the tile track should be ignored. Additionally, visual information in a tile track does not differ from the visual information in its related base track. In particular, there is no need to redefine information like clean aperture box 'clap' or pixel sample aspect ratio 'pasp' in the sample description.

For the sample description type 'hvt1', neither the samples in the tile track or the sample description box can contain PS, SPS or PPS NAL units. These NAL units must be in the samples or in the sample description box of the track containing the base layer (as identified by the track references) in case of scalability or in a dedicated track such as dedicated track 210 in FIG. 2b.

Sub-sample and sample grouping defined for regular HEVC samples have the same definitions for an HEVC tile sample. The dependencies between the parameter set/base track 210 and the tile tracks are preferably described using a track reference box "tref" of type 'scal' referenced 211 (or any other four-byte code signaling an extractor-based tiling dependency).

HEVC video coding standard supports multi-layer video encoding for multi-view or scalable applications. In this case, a given layer can be used as reference data for one or more other layers.

FIG. 3, comprising FIGS. 3a, 3b, and 3c, illustrates different examples of configurations of HEVC scalable bit-streams.

FIG. 3a is an example of a spatially scalable video bit-stream comprising a base layer 300 and an enhancement layer 305. Enhancement layer 305 is encoded as a function of base layer 300. In such a video bit-stream format, there exists a picture to picture dependency since none of the base and enhancement layers contains tiles.

FIG. 3b illustrates another example of a scalable video bit-stream comprising a base layer 310 and an enhancement layer 315. According to this example, enhancement layer 315 is a tiled enhancement layer comprising, in particular, tile 320. In such a video bit-stream format, there exists a tile to picture dependency since tiles of the enhancement layer depend on the base layer.

FIG. 3c still illustrates another example of a scalable video bit-stream comprising a base layer 325 and an enhancement layer 330. According to this example, base layer 325 is a tiled base layer comprising, in particular, tiles 335 and 340, and enhancement layer 330 is a tiled enhancement layer comprising, in particular, tile 345 and tile set 350. Base layer 325 can be spatially enhanced with enhancement layer 330. In such a video bit-stream format, there exists a tile to tile dependency since tiles of the enhancement layer depend on tiles of the base layer. There also exists a tile set to tile dependency since a tile set of the enhancement layer depends on tiles of the base layer. For the sake of illustration, tile 345 depends on tile 340 and tile set 350 depends on tile 335. Other dependencies may exist such as a tile to tile set dependency or a tile set to tile set dependency.

It is to be noted that similar configurations exist for a SNR scalable layer which may or may not be tiled on top of a base layer which also may or may not be tiled.

FIG. 4 illustrates a temporal pipe of tiles selected by a user to be displayed. More precisely, FIG. 4 represents a first video frame n and a second video frame n+m (where n and m are integer values), each of the first and second video frames comprising twelve tiles numbered 1 to 12. For the sake of illustration, only the third and seventh tiles are to be displayed (as denoted with bold lines) amongst these twelve tiles. Video frames n and n+m belong to a series of consecutive frames corresponding to a given temporal period. Therefore, the third and seventh tiles of each frame from frame n to frame n+m are displayed consecutively.

However, the data of a video bit-stream conforming to the standard mp4 file format are organized as temporal samples that correspond to full frames. Accordingly, it is required to access several small byte ranges for each frame when particular spatial areas of these frames are to be accessed during a given period of time as described above by reference to FIG. 4. This is inefficient in HTTP streaming in terms of the number of generated requests and in terms of data overhead. It is also less efficient for bit-stream extraction for RTP streaming because it requires multiple small file seeking operations.

Therefore, to provide a more efficient access in compressed videos for ROI streaming, the timed media data bit-stream is to be reorganized so that data of a particular tile are organized as a contiguous byte range (forming a pipe) for a given time period (i.e. a set of consecutive frames).

Accordingly, when only a spatial sub-part of video frames is to be displayed, only pipes of tiles corresponding to the selected spatial area must be downloaded (for instance tiles 3 and 7 in FIG. 4) using one HTTP request per pipe and per time period. Similarly, in RTP streaming, a server can extract more efficiently bigger data chunks from a source such as a hard disk, corresponding to a pipe of tiles.

According to an embodiment of the invention, there is provided a unified tile descriptor to handle single tile and set of tiles for single and multi-layer video tracks in a transparent way, whatever the tile is independently decodable or not. In this embodiment, a tile corresponds to one subsample obtained from at least one timed sample (e.g. images).

FIG. 5 provides the structure and features of the unified tile descriptor. It is a specific VisualSampleGroupEntry and is intended to be described as a property in the SampleGroupDescriptionBox of grouping_type 'trif', associated or not to a SampleToGroupBox with the same grouping_type. The various parameters contained in this unified tile descriptor are described below.

groupID is a unique identifier for the tile region (either a rectangular region in an image or non-rectangular region but without holes) described by this group. Value 0 is reserved for special use in the 'nalm' box.

independent_idc specifies the coding dependencies between this tile region and other tile regions in the current picture and in reference pictures, whether from the same layer or not. This flag takes the following values:

If independent_idc equals 0, the coding dependencies between this tile region and other tile regions in the same picture or previous pictures are given by the list of dependencyTileGroupID. If dependency_tile_count is 0, these dependencies are unknown.

If independent_idc equals 1, there are no temporal dependencies between this tile region and the other tile regions with different groupID in any reference pictures in the same layer but there can be coding dependencies between this tile and the tile region with the same groupID in the reference pictures in the same layer, or with different groupID in other layers. If the associated sample this tile belongs to is a random access sample as defined for this HEVC layer, the coding dependencies between this tile region and other tile regions in lower layers are given by the list of irap_dependencyTileGroupID; if irap_dependency_tile_count is 0, these dependencies are unknown. If the associated sample this tile belongs to is not a random access sample as defined for this HEVC layer, the coding dependencies between this tile region and other tile regions in lower layers are given by the list of dependencyTileGroupID; if dependency_tile_count is 0, there are no coding dependencies between this tile region and other tile regions in any reference picture of other layers for non random access samples.

If independent_idc equals 2, there are no coding dependencies between this tile region and any other tiles in the reference pictures.

Value 3 is reserved.

full_picture, when set, indicates that this tile region is actually a complete picture, in which case region_width and region_height shall be set to the layer luma size, and independent_flag shall be set to 1. This allows expressing dependencies between tiles of a layer to a non-tiled layer, the later using a 'trif' sample group with full_picture parameter set to 1. When tile_group is set to 1 and full_picture is set to 1, the union of tile regions identified by tileGroupID list shall completely cover (no holes, no overlap) the layer luma plane.

filtering_disable, when set, indicates that no post-decoding filtering operation on this tile region require access to pixels adjacent to this tile region, i.e. bit-exact reconstruction of the tile region is possible without decoding the adjacent tiles.

tile_group, when set to 1, indicates that this tile region is the result of visually grouping the tile regions identified by tileGroupID. This allows describing non rectangular tile regions. When set to 0, the tile region shall be used to describe a rectangular, dense rectangle (i.e. without holes) of HEVC tiles.

has_dependency_list: when set to 1, indicates that a list of dependencies is present. If set to 0, dependency_tile_count is assumed to be 0.

has_irap_dependency_list: when set to 1, indicates that a list of dependencies for random access samples is present. If set to 0, irap_dependency_tile_count is assumed to be 0.

horizontal_offset and vertical_offset give respectively the horizontal and vertical offsets of the top-left pixel of the rectangular region represented by the tile region, relative to the top-left pixel of the picture, in luma samples of the base region. When tile_group is set to 1, these values are inferred to be the minimum values of horizontal_offset, vertical_offset of the tiles regions identified by tileGroupID.

region_width and region_height give respectively the width and height of the rectangular region represented by the tile region, in luma samples of the base region. When tile_group is set to 1, these values are inferred to be the width and height of the region described by the union of tiles regions identified by tileGroupID.

tile_count gives the number of tiles regions from which this tile region is defined.

tileGroupID indicates the tile region groupID value (as defined by a TileRegionGroupEntry) of a tile region that belongs to this tile region.

dependency_tile_count indicates the number of tile regions in the dependency list.

dependencyTileGroupID gives the identifier of a tile region (as defined by a TileRegionGroupEntry) that this tile region depends on.

irap_dependency_tile_count and irap_dependencyTileGroupID specify an additional list of tile region(s) this tile region depends on when the sample this tile region belongs to is a random access sample as defined for this HEVC layer.

For tile tracks as defined in HEVC and L-HEVC standards, the base region used in the TileRegionGroupEntry is the size of the picture to which the tile belongs. Note that for L-HEVC streams using spatial scalability and tiling on both the base and enhancement layers, the TileRegionGroupEntry sample descriptions of the base layer will give coordinates expressed in luma samples of the base layer, while the TileRegionGroupEntry sample descriptions of the enhancement layer will give coordinates expressed in luma samples of the enhancement layer.

The unified tile descriptor reduces the number of sample groups present in SampleTableBox 'stbl' or in track fragments 'traf'. It also simplifies the description of inter-layer dependencies of HEVC tiles since only one descriptor has to be parsed, whatever a single tile or a tile set is described. It also simplifies the encapsulation process for mp4 writer.

As an alternative embodiment and for specific coding configurations, we may change the signification of the groupID to allow it to describe the same tile across different layers. For example, when grid of tiles is aligned across layers (all tiles have the same positions in both layers). This can be the case for two SNR scalability layers for example.

This way, a single tile descriptor can be declared in the track, for the two layers, instead of two tile descriptors, one per layer.

Another embodiment consists in reserving another value for the independent_idc flag to indicate that a tile or tile set is independent in its layer but has dependencies in other layers, but only on the same co-located tile or tile set. This could avoid the explicit declaration of the dependencies list, even with multi-layer video.

Another embodiment combining the tile_group flag and the reserved bit so as to form a 2-bit parameter, can consist in signaling in the tile descriptor whether the tile is single tile (00 in binary), a tile set (01) or a tile subset (10), the value (11) being reserved. The new point here is the handling of encoding configuration where one slice contains more than one tile. Using the new 2-bit parameter and when set to 10 (in binary), it also allows to indicate some coding dependencies for tiles inside a slice. This can be useful when one wants to extract for storage or streaming only a tile in the slice.

Figure 9:
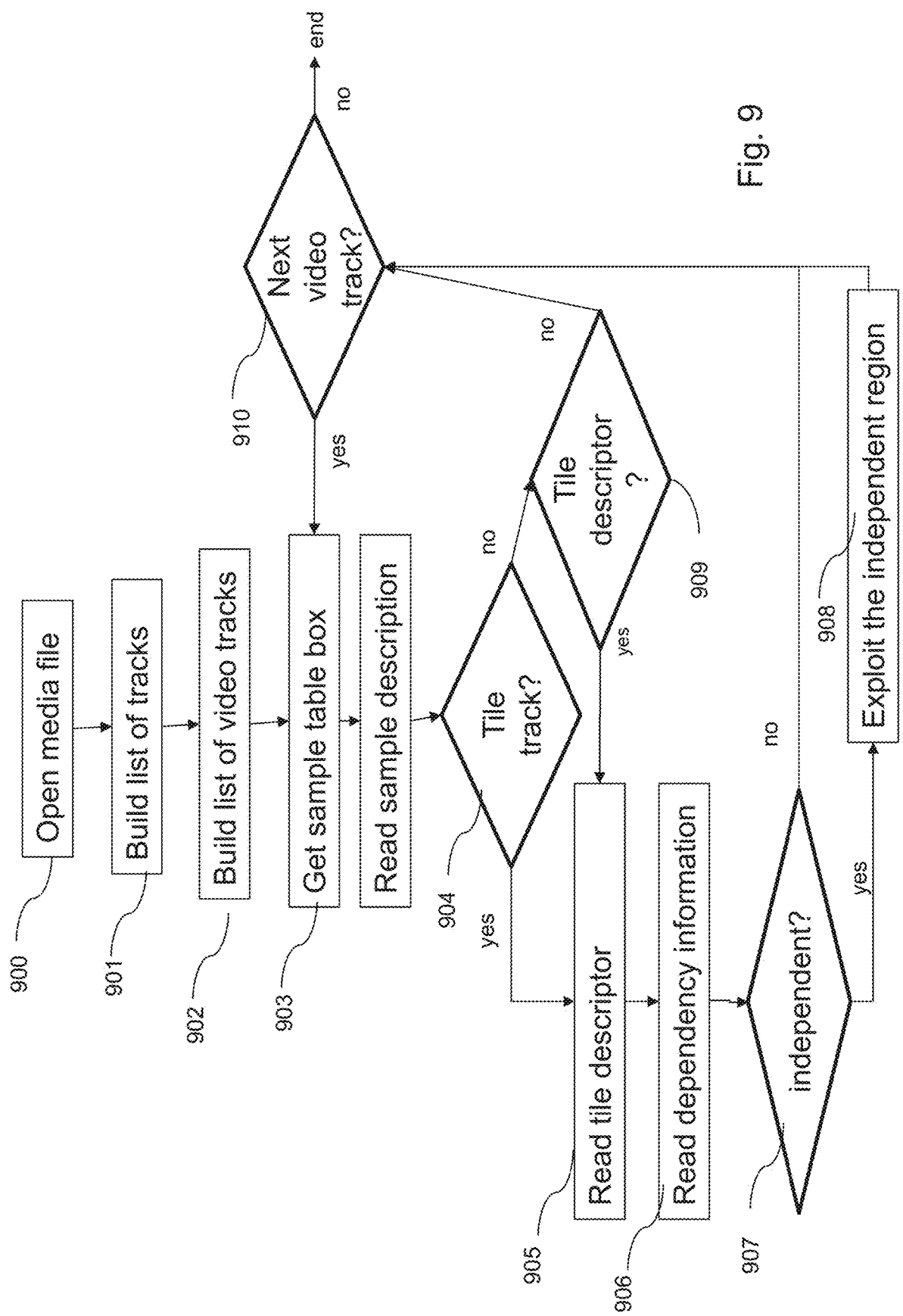
FIG. 9 illustrates a parsing process by a media player to retrieve tile information.

FIG. 9 illustrates the parsing of a media file containing the tile descriptor according to the invention. This tile descriptor can be exploited by a ISOBMFF parser and more generally by media players to inform users on presence of region of interests in a video (908) or to identify data for a region of interest to transmit these data or store these data in another file. For that, the player opens a media file and starts by building a list of tracks declared in the file in 901. It selects the video track, looking at the track handler declared in the track boxes in 902 and for these video tracks get the sample table box in 903. It can then determine the kind of samples contained in the video tracks in 904, in particular whether they correspond to tile tracks or not (test 904). If it is the case it means a tile descriptor is available for the track. It is read in 905 to get tile position and sizes, then dependency is read from the tile descriptor in 906 and if it indicated that the tile is independently decodable (test 907; from various dependencies flags or from independent_idc flag as explained above). If independently decodable, the tile can be exploited (display, storage, transmission, extraction, for user interface or information . . . ) in 908. If the video track is not a video track, the mp4 parser looks for a tile descriptor in the list of sample group description boxes in 909. If one is found it is processed in steps 905 to 908 and next video track is processed in 910 and iterates over 903. The tile processing terminated when no more video tracks are available in 910.

Another embodiment for the tile descriptor is to have a codec-agnostic part and a codec-specific part. Two alternative examples of the codec-agnostic part are shown on FIG. 6. The first alternative 601 defines the new TileRegion sample group entry, identified by a specific reserved code, for example 'tile'. The TileRegion sample group description is used to describe the spatial relationship between video or image media tracks. It allows identifying that decoded samples of a track spatially correspond to a given rectangular area in another track. It contains the following parameters:

region_id is a unique identifier for all tile region sample group descriptions that relate to the same visual region.

horizontal_offset and vertical_offset give respectively the horizontal and vertical offsets of the top-left coordinate of the rectangular region represented by the rectangular tile region, relative to the top-left coordinate of the reference region. The reference region is the region formed by the union of all sample group description of type 'tile' with the same region_id.

region_width and region_height give respectively the width and height of the rectangular region represented by the rectangular tile region, in integer coordinates.

The units used to describe the region size are arbitrary units and may correspond to video pixel resolution, but don't have to.

This new TileRegion sample group description is used to describe the spatial relationship between video or image media tracks. It allows identifying that decoded samples of a track spatially correspond to a given rectangular area in another track. This can be useful for media files or live media streams encapsulating multiple video tracks. For example a TV program where several views are proposed, this can be used, depending on the current camera arrangement in displays (position of these different videos, for example picture in picture or video in video) to know where a specific content associate to one of the video tracks is located. This can be useful for example if video gadgets have to be superimposed or if subtitles have to be associated to the video. In general, a video track "A" may use a track reference of type "tile" to a video track "B" in order to indicate that the content of "A" is a rectangular region of the content of "B". The description of the location of this area is given by TileGroupEntry sample group descriptions like in 401.

The other alternative 602 contains the following parameters:

full_picture parameter (for example on one bit) that when set to 1, indicates that this rectangular tile region is actually a complete picture, in which case region_width and region_height shall be set to the width and height of the reference region. Semantics for this field may be further restricted by derived specifications, like for example codec specific file formats.

The template parameter is reserved but can be overridden by other specifications like for example codec specific file formats.

groupID is a unique identifier for all tile region sample group descriptions that relate to the same visual region. Value 0 is reserved for special use by derived specifications. Derived specification may override the semantics of this field.

horizontal_offset and vertical_offset give respectively the horizontal and vertical offsets of the top-left pixel of the rectangular region represented by the rectangular tile region, relative to the top-left pixel of the reference region. For the context of this specification, the reference region is the region formed by the union of all sample group description of type 'trif' with the same groupID. Semantics for this field may be further restricted by derived specifications like for example codec-specific file formats.

region_width and region_height give respectively the width and height of the rectangular region represented by the rectangular tile region, in luma samples.

Alternative embodiments exist for these two variants, in particular adding place holders (or reserved bits) at the end to provide codec-specific information, like for example the dependency information (independent_idc) flag of the unified tile descriptor or the various dependency lists.

Figure 7:
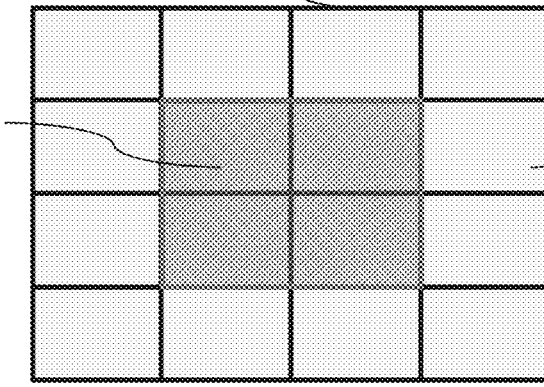
FIG. 7 illustrates another embodiment for the unified tile descriptor to address specific tile-based use case.

FIG. 7 illustrates another embodiment for the unified tile descriptor 701 to address specific tile-based use case. In particular, it allows to address video sample organization as on 702 where each tiled video sample has a region of interest 703 and other tiles corresponding to background of the video (704). The new hidden flag proposed in the tile descriptor 701 allows to encapsulate less important tiles, here the background ones in a dummy or virtual tile descriptor.

Typically, the tile descriptor for the region of interest contains the sizes of the region 703 and its positions in the video 702. But for background tiles, it is more efficient to define one rectangular region and mark it as hidden or not intended to be displayed, setting this hidden flag to 1. This informs a parser that position and size information is not reliable and not intended to be used. As such, instead of defining one or more rectangular regions with multiple unified tile descriptors, only one dummy tile descriptor is sufficient. Moreover, it allows to describe any arbitrarily shaped region in the image, even with holes. This is useful for bit-stream extraction when a player needs to extract only the region of interest. Since bit-stream extraction is a subtraction process, the mp4 parser or multimedia player needs to rapidly identify the track or the sample or the NAL units (resp. when tiles are in tile track, mapped through samples groups and mapped via NALU mapping) to discard so as to obtain the region of interest. Identifying a dummy tile descriptor, it would get the information that related track or samples or NAL units can be safely discarded from the bit-stream. An alternative to the use of this specific flag or parameter can be to indicate that when sizes are set to 0, then it is a dummy tile descriptor and then a region not intended to be displayed. An additional parameter can also be added to the unified tile descriptor to annotate the region, using for example an additional string parameter (not represented on FIG. 7). This additional string parameter can take: "ROI", "background" text description. Another advantage of dummy tile descriptor is that when content creator prepares a media presentation for streaming, the DASH packager in charge of transforming the ISOBMFF file into streamable DASH segments has the indication that, for example a tile track is a dummy one and this one would automatically not be exposed at DASH level.

It has to be noted that the tile_group parameter of the unified tile descriptor can be used to control the access granularity in terms of tiles. For example, one can decide to encapsulate video samples as on 702 into a first tile describing the region of interest 703 as a single rectangular region (thus not providing a finer access than the region: no access to each tile composing this region of interest is provided). This, when tile tracks are exposed in streaming manifest for tile-based transmission or adaptation can save description size in the streaming manifest and makes adaptation easier for DASH clients (less choices and configuration to compare and select).

When tiles are encapsulated in their own tracks, they refer to a base tile track to access initialization information, typically the parameter sets. There are cases where all tiles share the same set of properties with the base tile track: sync sample, dependency, sap types, 'rap' and 'roll', likely most of the defined sample groups (except tiling). Some tables cannot be omitted in a track as their absence already has meaning (namely sync sample table). In order to avoid duplicating this info in NxM tile tracks (N being the number of tiles in horizontal dimension and M the number of tiles in the vertical dimension), a new mechanism for sample grouping is introduced:

"Samples from a tile track inherit any property defined through sample groups for the corresponding sample in the base track, unless a sample group description of the same type is given in the tile track. For example, if the base tile track has a 'roll' sample group description and the tile track does not, the roll distance for samples in the tile track is the same as the roll distance for samples in the base track. More generally, when a sample group description (resp. sample to group) of a given grouping_type value is not present in a tile track but is present in the base tile track, the sample group description (resp sample to group) of the given grouping_type of the base track applies to the samples of this tile track. This can reduce redundancy of some sample groups in multi-track files.

To have this behavior explicit, SampleToGroup and SampleToGroupDescription are modified so as to indicate this information to the tracks they are related to (or tracks using them through the track reference mechanism). This can be done with a new version of these boxes and a new parameter, called for example shareable that takes a binary value: 1 means shareable (i.e. dependent tracks not redefining it will directly reuse the box) or 0 (i.e. dependent tracks not redefining it will not be able to share directly the box). Another embodiment for this new parameter is to have different values of inheritance, like for example "public", "protected", "private" with the following semantics:

"public" means that all tracks with same media type inherits the sample group and/or sample group description boxes from the track declaring these new sample group boxes.

"Protected" means that only the track referencing the track declaring these new sample group boxes as a base track, for example vie 'tile', 'sbas', 'scal' or 'tbas' can inherit the so-declared sample groups and properties.

"private" means that no track can reuse these new sample group and/or description boxes.

To make easier the tile-based streaming, the tile tracks from the ISOBMFF file or segment files have to be exposed in a streaming manifest or playlist. In a preferred embodiment, we consider the MPEG DASH protocol for adaptive streaming on HTTP.

Figure 8:
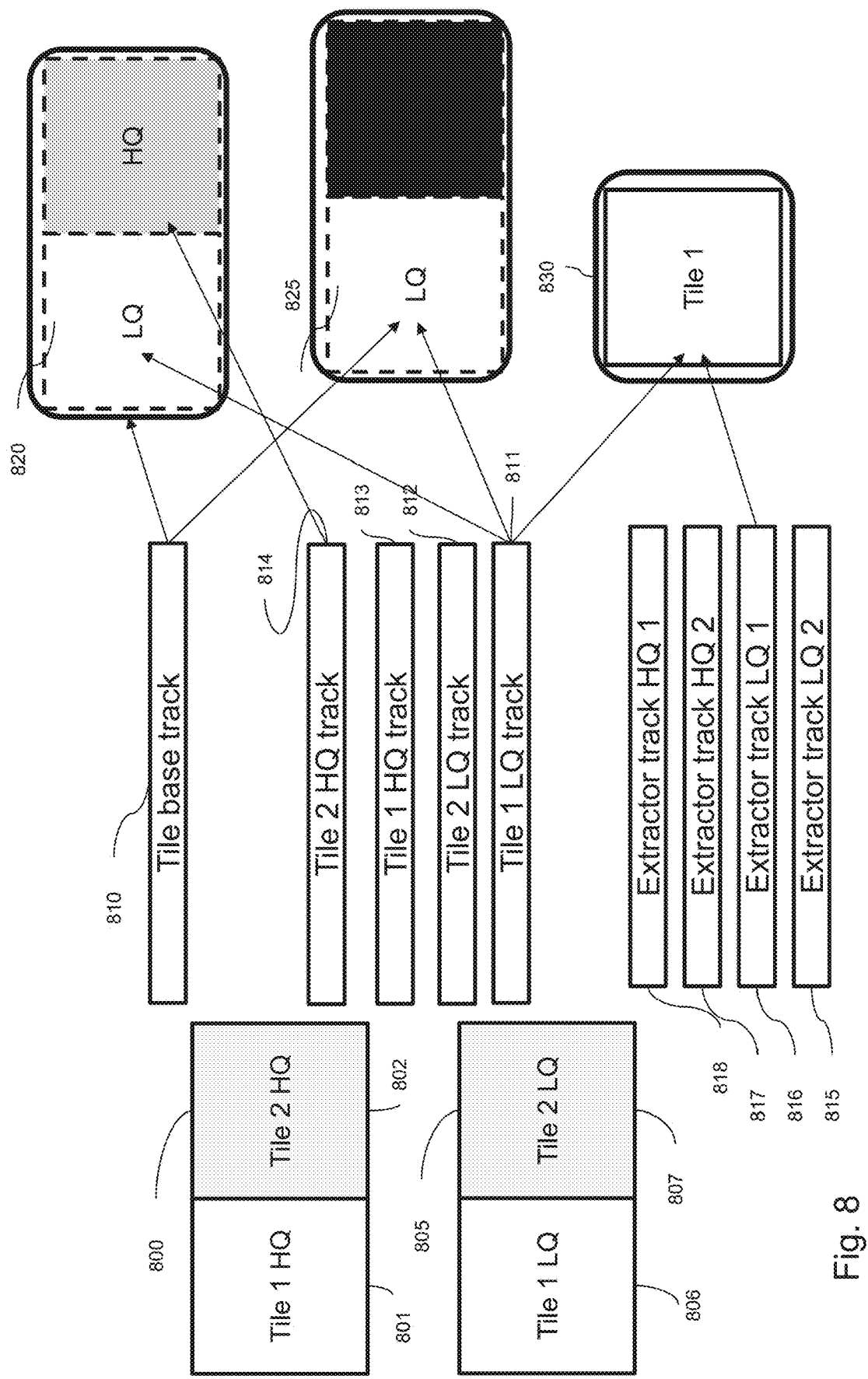
FIG. 8 illustrates various rendering use cases of tile tracks.

When constraining the HEVC parameter sets to be identical among different versions of the stream, it is possible to combine the tiles from these versions into a conformant HEVC bit-stream, decodable using a single decoder, thereby opening the possibilities to adapt the bitrate on a tile-basis, rather than on a complete sequence level, as shown on FIG. 8 (in 820). FIG. 8 illustrates some usages of tile tracks for tile-based rendering: tile-based adaptation 820, tile-based view 825 or tile-based transcoding and rendering as a full-picture 830. Each tile of each quality can typically be packaged in a single track containing only tile-related Video Coding Layer NAL units, and most non Video Coding Layer (non-VCL) NAL units would be in a dedicated track, called "base tile track".

In such case, reconstruction of the full Access Unit (AU) can be achieved based either on extractors from the base tile track to tile tracks, or on implicit AU reconstruction rules (mostly VCL NALU concatenation rules) from the base track to tile tracks.

It is to be noted that if only a subset of the complete tiles of an HEVC sequence should be decoded then un-needed tile tracks can be discarded and/or some extractors can be ignored while decoding the HEVC sequence; this would however not rebuild a complete image as shown in FIG. 8 on 825 part where only one of the two tiles is selected (black area on the right of 825 for which no data is received).

The HEVC file format also defines an extractor format giving rules to rewrite part of the bit-stream while copying other parts. A typical use case for this is to provide an extractor track that extracts a tile of a NxM motion-constrained tiled HEVC bit-stream into a conformant, non-tiled HEVC bit-stream with the same resolution as the extracted tile, allowing full-frame playback of a single tile without having to strip part of the reconstructed picture as shown on

830 on FIG. 8. Obviously, accessing only the tile of interest through DASH rather than the entire bit stream would save quite a lot of bandwidth and is interesting for ROI inspection using DASH or any adaptive streaming protocol.

In order to perform tile-based access to the video bitstream, the base tile track 810 and the tile tracks 811 to 814 are each mapped to an MPEG-DASH Representation in its own AdaptationSet, where the tile location is given by an SRD descriptor at the AdaptationSet level. Each tile track Representation then has a dependencyId attribute towards the "base tile track", allowing locating and loading all non-VCL data for that track. Two approaches are then possible in order to reconstruct the complete video from all the tile tracks, as illustrated on FIG. 8 and described in the tables of the Appendix.

In the first approach, corresponding to 820 rendering and Table 1, all tile tracks 811 to 814 Representations and the base tile track 810 Representation share the same initialization segment (same physical file on media server called "v_base.mp4"), repeated in streaming manifest with each tile track Representation and with the base tile track. The base tile tracks 811 to 814 are described as Representations with the codecs attribute set to 'hvt1' followed by profile/tier/level information. The DASH client is responsible for fetching in order the different tiles of interest (from the corresponding AdaptationSets and/or Representations of the DASH MPD), for example selected by a user from a user interface. The user interface can for example reflect the SRD information obtained by DASH client during MPD parsing and can display the grid of tiles somewhere on the user interface. Each cell of the grid of tiles can be clickable to select one or a set of tiles. Each cell in the grid of tiles is then related to an AdaptationSet declared in the manifest. The DASH client then knows that clicking a cell or a selection of cells means selection of the one or more related AdaptationSets. This simplifies the design of the MPD, but however requires special processing at the DASH client to identify that all tiled Representations (Representation for tile tracks) belong to the same coded object, by analyzing dependency indications (for example the dependencyId attribute in DASH), mime type and SRD parameters. The so-selected tile tracks (through the AdaptationSets or Representations for example) are rendered as they are placed in the original file: i.e. the reconstructed video bit-stream for a selected tile is rendered in its position given in the SRD and from the position in the original video sequence as shown in 820. When selecting multiple tiles to be played together, then the initialization segment may be requested twice. But the HTTP stack of the DASH client will already have this segment in its cache and the request would then not be issued again. It is to be noted that the Representation for the base tile track 810 in the Table 1 has specific SRD annotation with object_width and object_height set to 0. This is an indication that should prevent DASH clients to select this base tile track alone. Indeed, it is declared in the manifest so that tile tracks depending on it can obtain initialization information. The trick in the description of Table 1 is that the initialization segment is declared in each Representation of the tile tracks but in terms of encapsulation it is placed in the base tile track. In this scenario, the DASH client needs to identify that all adaptation sets with Representation containing tracks of type "hvt1" and the same SRD source_id are a single video object, and should not instantiate multiple video decoders. This differs from "regular" logic in DASH (with or without SRD) where each AdaptationSet maps to a single decoder, but is actually very close to multi-view use cases (each view in a given adaptation set) or a spatial scalable use case where UHD enhancement and HD base layer would be in separate adaptation set.

In the second approach, represented in Table 2 in the appendix, each tile track Representation (or the base tile track 810 Representation) has its own initialization segment, typically including only the tile track and the base tile track (signaled with SRD object_width and object_height set to 0 to avoid selection by a DASH client). This description complies with the DASH rule on different initialization segments for dependent Representations. In addition to the AdaptationSets for tile and base tile tracks, an extra "aggregation" AdaptationSet (for example using extractors as in composite track) is used to describe the set of tile tracks composing the full video for each quality; the Representations in this set would have their own initialization segment including all tile tracks, and dependencyId to all tile tracks Representation; the media segments of this Representation will be empty, as all data is carried in the base track and the tile tracks. This design is a bit heavier but does not require specific processing of the DASH client in order to reconstruct the full video. However, this design does not allow expressing adaptation rules of the tile tracks Representation, as the aggregated Representation (the ones with codecs="hev2 . . . " on Table 2) explicitly gives the list of dependencies that have to be followed by the DASH engine. In this case, the selected tile track is rendered as a new compliant HEVC bit-stream resulting from high-level syntax modification (for example by transcoding video sizes and rewriting the position of the coding tree blocks for the tile) to render the tile or a set of tile as a new full video as shown in 830.

The condition on different initialization segments for the Representations in Table 2 comes from the DASH specification on handling of initialization segments in case of dependent Representations. However, since the base track cannot be used without the tile tracks, and a single tile track with its base being an incomplete HEVC bit-stream, enforcing different initialization segments is relevant in the tiling case. This design does not allow expressing adaptation rules of the tile tracks representation, as each aggregated representation explicitly gives the list of dependencies that have to be followed by the DASH engine. One approach to fix this problem is to declare in the manifest all the possible tile combinations in the "aggregated" AdaptationSet, but this becomes heavy when using 3×3 or more tiling. For example, a two alternative bitrates for a 3×3 tiling would lead to 512 combinations.

Table 3 is another example of a DASH description of tile tracks containing the proposed tile descriptor. In order to perform full HEVC reconstruction from a tile without accessing the entire tiled bit-stream, each tile of the video stream can be packaged in a single track of type hvt1, and extraction instruction would be in an additional track of type hev2/hvc2 (since the resulting extracted bit-stream is a conformant HEVC bit-stream). Both tracks can be packaged in a single media file (for example ISOBMFF file).

Table 4 is another example, reusing description of table 3 and adding an AdaptationSet for the full video that described a 2×1 tiling as on 800 on FIG. 8.

A preferred embodiment is illustrated in Table 5. This description of HEVC tile tracks embedding the proposed tile descriptor for tile-based adaptation keeps the MPD light. For that, the Adaptation Sets containing representations of codec type 'hvt1' shall only contain representation of type 'hvt1'. The Adaptation Sets containing Representations having a codecs (the "codecs" attribute in Table 5) type 'hvt1' shall contain an SRD descriptor as SupplementalProperty. These SRD parameters reflect the parameters stored in the tile descriptor 'trif' of the tile track. The base tile track of an 'hvt1' Representation (Representation with @ codecs='hvt1 . . . ') is given by the last entry in the dependencyId list that indicates a Representation with codec type hev2/hvc2. All 'hvt1' representations sharing the same base have identical switching and addressing properties as their base tile track: initialization segment, bitstreamSwitching, startWithSAP, segment duration or SegmentTimeline, startNumber, $Time$ or $Number$ addressing. The "base tile track" is declared in a dedicated AdaptationSet containing an essential property SRD descriptor, with object_x, object_y, object_width, object_height all being set to 0. Several tile representations, as indicated by the 'hvt1' codec type in the MPD, can be gathered in a single AdaptationSet if and only if they have the same dependencyId and correspond to the same tile, as indicated by the SRD descriptor in the AdaptationSet. Adaptation Sets containing representations of codec type 'hvt1' can then be decoded using a single HEVC decoder if and only if provided that they share the same base tile track, as identified by their dependencyId and that they belong to the same SRD group, as identified by the source_id of the SRD descriptor. This description and organization of the streaming manifest avoids defining one "aggregation" AdaptationSet per tile and allows miwing tiles at different qualities and/or ROI inspection use cases.

In the Table 5 example, each tile track is accessible as a single conformant HEVC video through the Representations N_K_x, (N being the tile number and K the quality level) while at the same time the complete video can be recomputed by feeding all selected 'hvt1' representations to the HEVC decoder associated with SRD sharing the same source_id value. (1 in the example of Table 5).

An alternative embodiment, instead of relying on 'hvt1' codec conditions is to define a new DASH descriptor, for example an EssentialProperty with schemeIdUri equal to "urn:mpeg:dash:video:tile:2016" for the AdaptationSet containing tile representations (or in the Representation itself) and another descriptor, for example with "urn:mpeg:dash:video:basetile:2016" schemeIdUri value for the "base tile track" (the new descriptor is placed in the Representation or the AdaptationSet) describing this base tile track. This makes the manifest less HEVC_centric (i.e. extensible to other video compression formats) since no more relying on the specific sample entry 'hvt1'. This follows the generalization of the tile descriptor as a generic tile descriptor independent from the coding or compression format.

Figure 10:
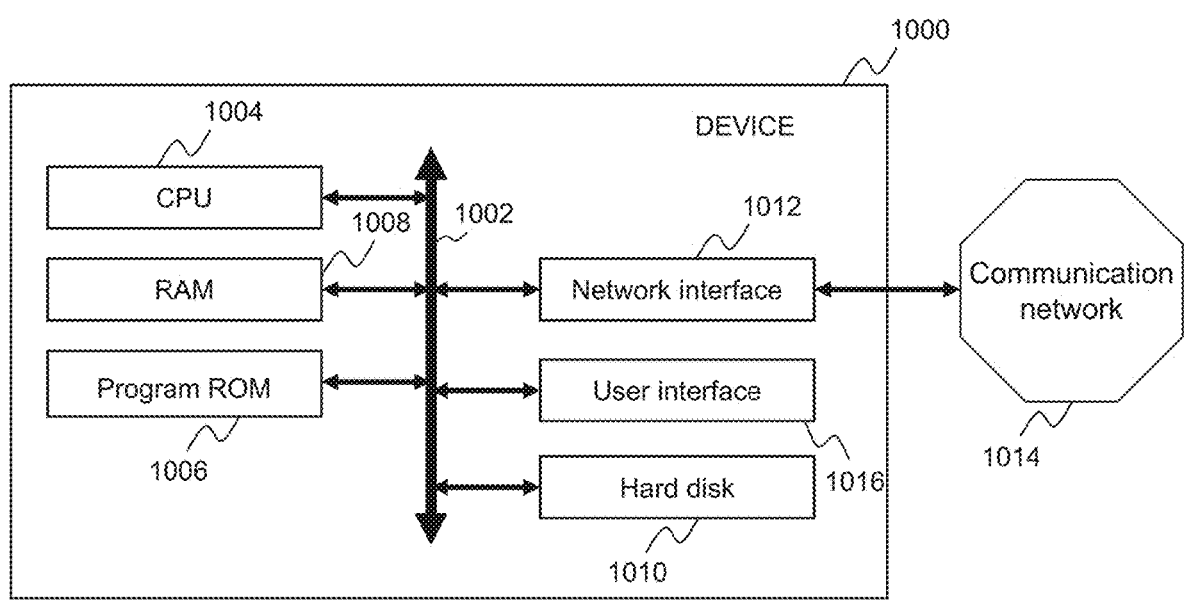
FIG. 10 represents a block diagram of a server or a client device in which steps of one or more embodiments may be implemented.

FIG. 10 represents a block diagram of a server or a client device 1000 in which steps of one or more embodiments may be implemented.

Preferably, the device 1000 comprises a communication bus 1002, a central processing unit (CPU) 1004 capable of executing instructions from program ROM 1006 on powering up of the device, and instructions relating to a software application from main memory 1008 after the powering up. The main memory 1008 is for example of Random Access Memory (RAM) type which functions as a working area of CPU 1004 via the communication bus 1002, and the memory capacity thereof can be expanded by an optional RAM connected to an expansion port (not illustrated). Instructions relating to the software application may be loaded to the main memory 1008 from a hard disk (HD) 1010 or the program ROM 1006 for example. Such software application, when executed by the CPU 1004, causes the encapsulation step described with reference to FIGS. 1 and 2 to be performed in the server.

Reference numeral 1012 is a network interface that allows the connection of the device 1000 to the communication network 1014. The software application when executed by the CPU 1004 is adapted to react to requests received through the network interface and to provide data streams and requests via the network to other devices.

Reference numeral 1016 represents user interfaces to display information to, and/or receive inputs from, a user.

It should be pointed out here that, as a variant, the device 1000 for managing the reception or sending of multimedia bit-streams can consist of one or more dedicated integrated circuits (ASIC) that are capable of implementing the method as described with reference to FIG. 9. These integrated circuits are for example and non-restrictively, integrated into an apparatus for generating or displaying video sequences and/or for listening to audio sequences.

Embodiments of the invention may be embedded in a device such as a camera, a smartphone, or a tablet that acts as a remote controller for a TV, for example to zoom into a particular region of interest. They can also be used from the same devices to have personalized browsing experience of a TV program by selecting specific areas of interest. Another usage of these devices by a user is to share selected sub-parts of his/her preferred videos with other connected devices. They can also be used in smartphone or tablet to monitor what happens in a specific area of a building placed under surveillance provided that the surveillance camera supports the generation part of this invention.

Naturally, in order to satisfy local and specific requirements, a person skilled in the art may apply to the solution described above many modifications and alterations all of which, however, are included within the scope of protection of the invention as defined by the following claims.

APPENDIX

TABLE 1

```
<MPD>
 <Period >
  <AdaptationSet maxWidth="1280" maxHeight="640" >
   <EssentialProperty schemeIdUri="urn:mpeg:dash:srd:2014" value="1,
0, 0, 0, 0"/>
    <SegmentTemplate initialization="v_base.mp4" ... />
     <Representation id="1" mimeType="video/mp4"
codecs="hev2.1.6.L186.0" width="1280" height="640" />
   </AdaptationSet>
  <AdaptationSet maxWidth="640" maxHeight="640" ...>
    <SupplementalProperty schemeIdUri="urn:mpeg:dash:srd:2014"
value="1, 0, 0, 640, 640"/>
    <SegmentTemplate initialization="v_base.mp4" ... />
    <Representation id="1_1" mimeType="video/mp4"
codecs="hvt1.1.6.L186.0" dependencyId="1" bandwidth="128000"/>
    <Representation id="1_2" mimeType="video/mp4"
codecs="hvt1.1.6.L186.0" dependencyId="1" bandwidth="768000"/>
   </AdaptationSet>
  <AdaptationSet maxWidth="640" maxHeight="640" ...>
    <SupplementalProperty schemeIdUri="urn:mpeg:dash:srd:2014"
value="1, 640, 0, 640, 640"/>
    <SegmentTemplate initialization="v_base.mp4" ... />
    <Representation id="2_1" mimeType="video/mp4"
codecs="hvt1.1.6.L186.0" dependencyId="1" bandwidth="128000"/>
    <Representation id="2_2" mimeType="video/mp4"
codecs="hvt1.1.6.L186.0" dependencyId="1" bandwidth="768000"/>
   </AdaptationSet>
  </Period>
</MPD>
```

TABLE 2

```
<MPD>
<Period >
 <AdaptationSet maxWidth="1280" maxHeight="640" >
  <EssentialProperty schemeIdUri="urn:mpeg:dash:srd:2014" value="1,0,0,0,0"/>
  <SegmentTemplate initialization="v_base.mp4" ... />
  <Representation id="1" mimeType="video/mp4" codecs="hev2.1.6.L186.0" width="1280" height="640"/>
 </AdaptationSet>
 <AdaptationSet ...>
  <Supplemental Property schemeIdUri="urn:mpeg:dash:srd:2014" value="1,0,0,640,640"/>
  <SegmentTemplate initialization="v_tile1.mp4" ... />
  <Representation id="1_1" mimeType="video/mp4" codecs="hvt1.1.6.L186.0" dependencyId="1" bandwidth="128000"/>
  <Representation id="1_2" mimeType="video/mp4" codecs="hvt1.1.6.L186.0" dependencyId="1" bandwidth="768000"/>
 </AdaptationSet>
 <AdaptationSet ...>
  <Supplemental Property schemeIdUri="urn:mpeg:dash:srd:2014" value="1,640,0,640,640"/>
  <SegmentTemplate initialization="v_tile2.mp4" ... />
  <Representation id="2_1" mimeType="video/mp4" codecs="hvt1.1.6.L186.0" dependencyId="1" bandwidth="128000"/>
  <Representation id="2_2" mimeType="video/mp4" codecs="hvt1.1.6.L186.0" dependencyId="1" bandwidth="768000"/>
 </AdaptationSet>
 <AdaptationSet ...>
  <Supplemental Property schemeIdUri="urn:mpeg:dash:srd:2014" value="1,0,0,1280,640"/>
  <SegmentTemplate initialization="v_all.mp4" ... />
  <Representation id="A_1" mimeType="video/mp4" codecs="hev2.1.6.L186.0" dependencyId="1_1 2_1"/>
  <Representation id="A_2" mimeType="video/mp4" codecs="hev2.1.6.L186.0" dependencyId="1_1 2_2"/>
   <Representation id="A_1" mimeType="video/mp4" codecs="hev2.1.6.L186.0" dependencyId="1_2 2_1"/>
   <Representation id="A_2" mimeType="video/mp4" codecs="hev2.1.6.L186.0" dependencyId="1_2 2_2"/>
  </AdaptationSet>
 </Period>
</MPD>
```

TABLE 3

```
<MPD>
 <Period >
  <AdaptationSet maxWidth="1280" maxHeight="640" >
   <EssentialProperty schemeIdUri="urn:mpeg:dash:srd:2014" value="1,0,0,0,0"/>
   <SegmentTemplate initialization="v_base.mp4" ... />
   <Representation id="1" mimeType="video/mp4" codecs="hev2.1.6.L186.0" width="1280" height="640"/>
  </AdaptationSet>
  <AdaptationSet ...>
   <SupplementalProperty schemeIdUri="urn:mpeg:dash:srd:2014" value="1,0,0,640,640"/>
   <SegmentTemplate initialization="v_tile1_x.mp4" ... />
   <Representation id="1_1" mimeType="video/mp4" codecs="hev2.1.6.LXXX.0" dependencyId="1"/>
   <Representation id="1_2" mimeType="video/mp4" codecs="hev2.1.6.LXXX.0" dependencyId="1"/>
  </AdaptationSet>
  <AdaptationSet ...>
   <SupplementalProperty schemeIdUri="urn:mpeg:dash:srd:2014" value="1,640,0,640,640"/>
   <SegmentTemplate initialization="v_tile2_x.mp4" ... />
   <Representation id="2_1" mimeType="video/mp4" codecs="hev2.1.6.LXXX.0" dependencyId="1"/>
   <Representation id="2_2" mimeType="video/mp4" codecs="hev2.1.6.LXXX.0" dependencyId="1"/>
  </AdaptationSet>
 </Period>
</MPD>
```

TABLE 4

```
<MPD>
<Period >
 <AdaptationSet maxWidth="1280" maxHeight="640" >
  <EssentialProperty schemeIdUri="urn:mpeg:dash:srd:2014" value="1,0,0,0,0"/>
  <SegmentTemplate initialization="v_base.mp4" ... />
  <Representation id="1" mimeType="video/mp4" codecs="hev2.1.6.L186.0" width="1280" height="640"/>
 </AdaptationSet>
 <AdaptationSet ...>
  <SupplementalProperty schemeIdUri="urn:mpeg:dash:srd:2014" value="1,0,0,640,640"/>
  <SegmentTemplate initialization="v_tile1.mp4" ... />
  <Representation id="1_1" mimeType="video/mp4" codecs="hev2.1.6.LXXX.0" dependencyId="1"/>
  <Representation id="1_2" mimeType="video/mp4" codecs="hev2.1.6.LXXX.0" dependencyId="1"/>
 </AdaptationSet>
 <AdaptationSet ...>
  <SupplementalProperty schemeIdUri="urn:mpeg:dash:srd:2014" value="1,640,0,640,640"/>
  <SegmentTemplate initialization="v_tile2.mp4" ... />
```

TABLE 4-continued

```
<Representation id="2_1" mimeType="video/mp4" codecs="hev2.1.6.LXXX.0" dependencyId="1"/>
<Representation id="2_2" mimeType="video/mp4" codecs="hev2.1.6.LXXX.0" dependencyId="1"/>
</AdaptationSet>
<AdaptationSet ...>
<SupplementalProperty schemeIdUri="urn:mpeg:dash:srd:2014" value="1,0,0,1280,640"/>
<SegmentTemplate initialization="v_all.mp4" ... />
<Representation mimeType="video/mp4" codecs="hev2.1.6.L186.0" dependencyId="1_1 2_1"/>
<Representation mimeType="video/mp4" codecs="hev2.1.6.L186.0" dependencyId="1_1 2_2"/>
<Representation mimeType="video/mp4" codecs="hev2.1.6.L186.0" dependencyId="1_2 2_1"/>
<Representation mimeType="video/mp4" codecs="hev2.1.6.L186.0" dependencyId="1_2 2_2"/>
</AdaptationSet></Period>
</MPD>
```

TABLE 5

```
<MPD>
<Period >
<AdaptationSet maxWidth="1280" maxHeight="640" >
<EssentialProperty schemeIdUri="urn:mpeg:dash:srd:2014" value="1,0,0,0,0"/>
<SegmentTemplate initialization="v_base.mp4" ... />
<Representation id="1" mimeType="video/mp4" codecs="hev1.1.6.L186.0" width="1280" height="640"/>
</AdaptationSet>
<AdaptationSet ...>
<SupplementalProperty schemeIdUri="urn:mpeg:dash:srd:2014" value="1,0,0,640,640"/>
<SegmentTemplate initialization="v_base.mp4" ... />
<Representation id="1_1" mimeType="video/mp4" codecs="hvt1.1.6.L186.0" dependencyId="1"/>
<Representation id="1_2" mimeType="video/mp4" codecs="hvt1.1.6.L186.0" dependencyId="1"/>
</AdaptationSet>
<AdaptationSet ...>
<SupplementalProperty schemeIdUri="urn:mpeg:dash:srd:2014" value="1,640,0,640,640"/>
<SegmentTemplate initialization="v_base.mp4" ... />
<Representation id="2_1" mimeType="video/mp4" codecs="hvt1.1.6.L186.0" dependencyId="1"/>
<Representation id="2_2" mimeType="video/mp4" codecs="hvt1.1.6.L186.0" dependencyId="1"/>
</AdaptationSet>
<AdaptationSet ...>
<SupplementalProperty schemeIdUri="urn:mpeg:dash:srd:2014" value="1,0,0,640,640"/>
<SegmentTemplate initialization="v_tile1_x.mp4" ... />
<Representation id="1_1_x" mimeType="video/mp4" codecs="hev2.1.6.LXXX.0" dependencyId="1_1"/>
<Representation id="1_2_x" mimeType="video/mp4" codecs="hev2.1.6.LXXX.0" dependencyId="1_2"/>
</AdaptationSet>
<AdaptationSet ...>
<SupplementalProperty schemeIdUri="urn:mpeg:dash:srd:2014" value="1,640,0,640,640"/>
<SegmentTemplate initialization="v_tile2_x.mp4" ... />
<Representation id="2_1_x" mimeType="video/mp4" codecs="hev2.1.6.LXXX.0" dependencyId="2_1"/>
<Representation id="2_2_x" mimeType="video/mp4" codecs="hev2.1.6.LXXX.0" dependencyId="2_2"/>
</AdaptationSet>
</Period>
</MPD>
```

The invention claimed is:

1. A method for generating one or more media files based on video data, the method comprising:
   obtaining the video data;
   generating a plurality of tile tracks each containing video data of at least one tile region;
   generating a TileRegionGroupEntry to be used to describe a tile region of the video data and including a descriptor, which, when set to 1, indicates that a dependency list is present in said TileRegionGroupEntry, and when set to 0, indicates that the dependency list is not present in said TileRegionGroupEntry, wherein the dependency list includes 'dependency_tile_count' indicating a number of tile regions in the dependency list and includes, based on a value of said dependency tile count, DependencyTileGroupId, a list of which is used for describing coding dependencies between the tile region and other tile regions; and
   generating the one or more media files based on the plurality of tile tracks and said generated TileRegionGroupEntry including said descriptor indicating whether the dependency list is present or not in said TileRegionGroupEntry.

2. The method according to claim 1, wherein the TileRegionGroupEntry further includes a flag indicating that information relating to some tiles is not intended to be used.

3. The method according to claim 2, wherein the flag, when set to 1, indicates that the information is not intended to be used.

4. The method according to claim 1, wherein said TileRegionGroupEntry is included in a SampleGroupDescriptionBox for giving information about the characteristics of sample groups of the video data.

5. A method for processing one or more media files based on video data, the method comprising:
   receiving the one or more media files comprising (i) a plurality of tile tracks each contains video data of at least one tile region and (ii) a TileRegionGroupEntry to be used to describe a tile region of the video data, wherein the TileRegionGroupEntry includes a descriptor which, when set to 1, indicates that a dependency list is present in said TileRegionGroupEntry, and when set to 0, indicates that the dependency list is not present in said TileRegionGroupEntry, and wherein the dependency list includes 'dependency_tile_count' indicating a number of tile regions in the dependency list and includes, based on a value of said dependency tile count, DependencyTileGroupId a list of which is used for describing coding dependencies between the tile region and other tile regions; and representing video data of one or more tile regions by referring said received TileRegionGroupEntry including said descriptor indicating whether the dependency list is present or not in said TileRegionGroupEntry.

6. The method according to claim 5, wherein the TileRegionGroupEntry further includes a flag indicating that information relating to some tiles is not intended to be used.

7. The method according to claim 5, wherein said TileRegionGroupEntry is included in a SampleGroupDescriptionBox for giving information about the characteristics of sample groups of the video data.

8. A device for generating one or more media files based on video data, the method comprising:
   a hardware processor; and
   a memory storing one or more programs configured to be executed by the hardware processor, the one or more programs including instructions for:
   obtaining the video data;
   generating a plurality of tile tracks each contains video data of at least one tile region;
   generating a TileRegionGroupEntry to be used to describe a tile region of the video data and including a descriptor which, when set to 1, indicates that a dependency list is present in said TileRegionGroupEntry, and when set to 0, indicates that the dependency list is not present in said TileRegionGroupEntry, wherein the dependency list includes 'dependency_tile_count' indicating a number of tile regions in the dependency list and includes, based on a value of said dependency tile count, DependencyTileGroupId a list of which is used for describing coding dependencies between the tile region and other tile regions; and
   generating the one or more media files based on the plurality of tile tracks and said generated TileRegionGroupEntry including said descriptor indicating whether the dependency list is present or not in said TileRegionGroupEntry.

9. The device according to claim 8, wherein the TileRegionGroupEntry further includes a flag indicating that information relating to some tiles is not intended to be used.

10. The device according to claim 8, wherein said TileRegionGroupEntry is included in a SampleGroupDescriptionBox for giving information about the characteristics of sample groups of the video data.

11. A device for processing one or more media files based on video data, the method comprising:
   a hardware processor; and
   a memory storing one or more programs configured to be executed by the hardware processor, the one or more programs including instructions for:
   receiving the one or more media files comprising (i) a plurality of tile tracks each contains video data of at least one tile region and (ii) a TileRegionGroupEntry to be used to describe a tile region of the video data, wherein the TileRegionGroupEntry includes a descriptor which, when set to 1, indicates that a dependency list is present in said TileRegionGroupEntry, and when set to 0, indicates that the dependency list is not present in said TileRegionGroupEntry, and wherein the dependency list includes 'dependency_tile_count' indicating a number of tile regions in the dependency list and includes, based on a value of said dependency tile count, DependencyTileGroupId a list of which is used for describing coding dependencies between the tile region and other tile regions; and representing video data of one or more tile regions by referring said received TileRegionGroupEntry including said descriptor indicating whether the dependency list is present or not in said TileRegionGroupEntry.

12. The device according to claim 11, wherein the TileRegionGroupEntry further includes a flag indicating that information relating to some tiles is not intended to be used.

13. The device according to claim 11, wherein said TileRegionGroupEntry is included in a SampleGroupDescriptionBox for giving information about the characteristics of sample groups of the video data.

14. A non-transitory computer-readable storage medium storing a program for causing a computer to execute a method comprising:
   obtaining video data;
   generating a plurality of tile tracks each contains video data of at least one tile region;
   generating a TileRegionGroupEntry to be used to describe a tile region of the video data and including a descriptor which, when set to 1, indicates that a dependency list is present in said TileRegionGroupEntry, and when set to 0, indicates that the dependency list is not present in said TileRegionGroupEntry, wherein the dependency list includes 'dependency_tile_count' indicating a number of tile regions in the dependency list and includes, based on a value of said dependency tile count, DependencyTileGroupId a list of which is used for describing coding dependencies between the tile region and other tile regions; and
   generating the one or more media files based on the plurality of tile tracks and said generated TileRegionGroupEntry including said descriptor indicating whether the dependency list is present or not in said TileRegionGroupEntry.

15. The medium according to claim 14, wherein the TileRegionGroupEntry further includes a flag indicating that information relating to some tiles is not intended to be used.

16. The medium according to claim 14, wherein said TileRegionGroupEntry is included in a SampleGroupDescriptionBox for giving information about the characteristics of sample groups of the video data.

17. A non-transitory computer-readable storage medium storing a program for causing a computer to execute a method comprising:
   receiving one or more media files comprising (i) a plurality of tile tracks each contains video data of at least one tile region and (ii) a TileRegionGroupEntry to be used to describe a tile region of the video data, wherein the TileRegionGroupEntry includes a descriptor which, when set to 1, indicates that a dependency list is present in said TileRegionGroupEntry, and when set to 0, indicates that the dependency list is not present in said TileRegionGroupEntry, and wherein the dependency list includes 'dependency_tile_count' indicating a number of tile regions in the dependency list and includes, based on a value of said dependency tile count, DependencyTileGroupId a list of which is used for describing coding dependencies between the tile region and other tile regions; and representing video data of one or more tile regions by referring said received TileRegionGroupEntry including said descriptor indicating whether the dependency list is present or not in said TileRegionGroupEntry.

18. The medium according to claim 17, wherein the TileRegionGroupEntry further includes a flag indicating that information relating to some tiles is not intended to be used.

19. The medium according to claim 17, wherein said TileRegionGroupEntry is included in a SampleGroupDescriptionBox for giving information about the characteristics of sample groups of the video data.

* * * * *